No. 756,907.                                                    Patented April 12, 1904.

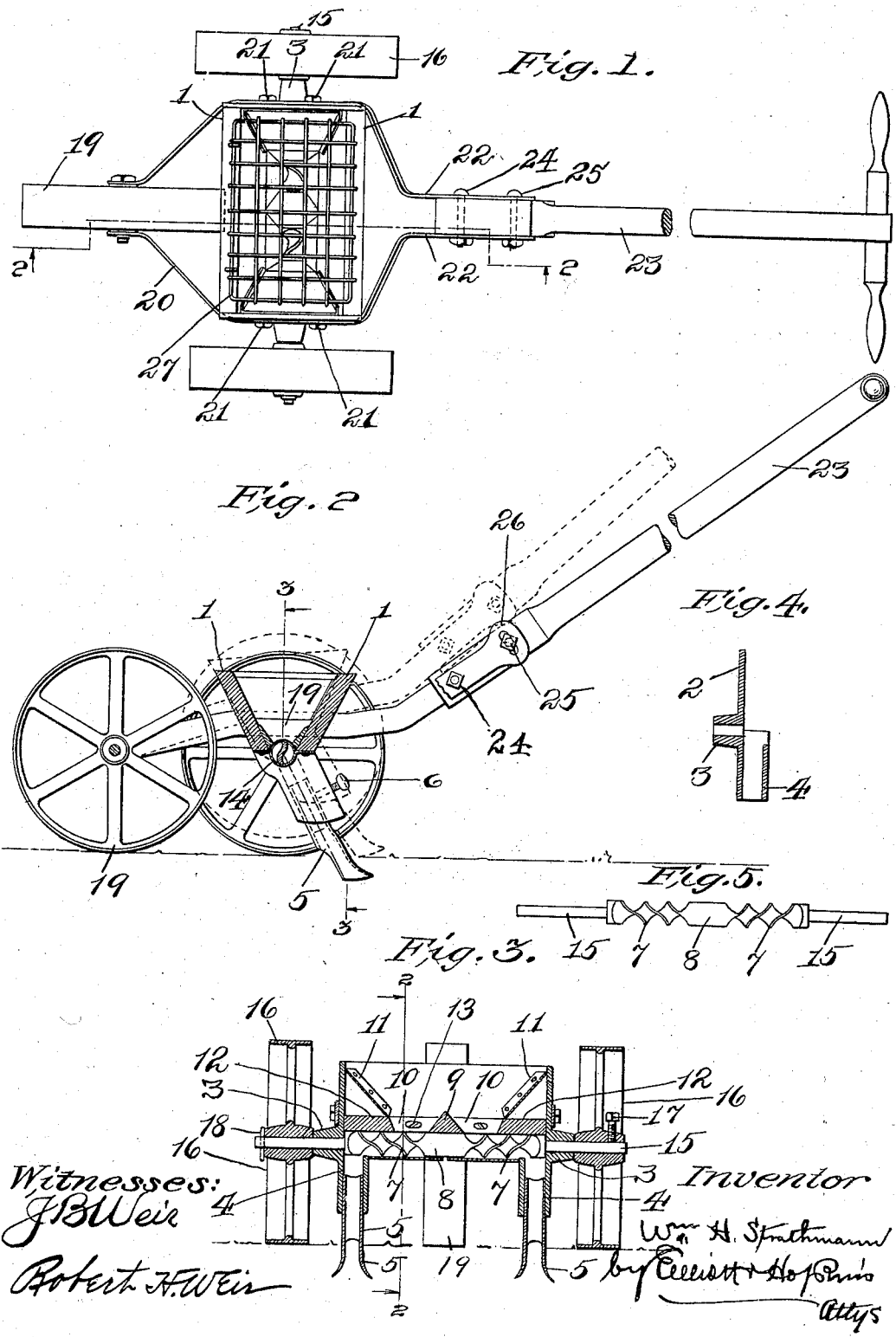

UNITED STATES PATENT OFFICE.

WILLIAM H. STRATHMANN, OF CHICAGO, ILLINOIS.

SEEDER FOR POULTRY-YARDS.

SPECIFICATION forming part of Letters Patent No. 756,907, dated April 12, 1904.

Application filed December 21, 1903. Serial No. 185,977. (No model.)

*To all whom it may concern:*

Be it known that I, WILLIAM H. STRATHMANN, a citizen of the United States, residing at Chicago, in the county of Cook and State of Illinois, have invented certain new and useful Improvements in Seeders for Poultry-Yards, of which the following is a full, clear, and exact specification.

My invention relates to a seeder for planting seed below the surface of the ground in poultry yards and sheds in order to compel the poultry to scratch for their food, and thus prevent the larger or more hardy fowls from depriving the smaller or weaker ones of their share of the food and at the same time compelling them to take their certain amount of exercise, which is necessary or beneficial in the development and growth of the fowls, enhancing their ability to lay, while also protecting the uneaten grain from rats and mice and deterioration of atmospheric influences and affording opportunity for many kernels of grain, which might otherwise be carried away by wild birds, to sprout, and thus become all the better as a poultry-food.

My invention has for its primary object to provide an improved and simple form of grain drill or seeder especially adapted for the described purpose and which shall be inexpensive and easy to operate.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a plan view of my improved seeder. Fig. 2 is a vertical section thereof, taken on the line 2 2, Fig. 1. Fig. 3 is a vertical section taken on the line 3 3, Fig. 2. Fig. 4 is a detail sectional view of one of the end plates or castings, taken on the line 3 3, Fig. 2; and Fig. 5 is a detail view of the axle and feed-screw hereinafter described.

The supply of grain to be planted is placed in a hopper preferably composed of a trough-shaped body portion 1, extending across the machine and having open ends each of which is closed by an end casting or member (shown in detail in Fig. 4) and which comprises a plate 2, closing the end of the trough 1, a journal-bearing 3 for the axle, as will be presently described, and a chute 4, in which is held the hoe or drill 5 by means of a set-screw 6 or other suitable device, the shank of the drill being contained within the chute 4, as shown in Fig. 3, so as to be capable of adjustment, whereby the hoe or drill may be projected into the ground at various depths, as required.

Journaled in the bottom of the hopper and extending longitudinally thereof is a double-ended feed-screw or conveyer comprising two screw portions 7, separated by a plane cylindrical portion 8. The cylindrical portion 8 is situated at about the mid-length of the hopper under a double incline 9, which directs the contents of the hopper in opposite directions toward the screw portions 7, respectively, and the screw portions are situated under openings 10 in the bottom of the hopper at each side of the double incline 9, and at the outer sides of these openings are arranged inclines 11 for directing the contents of the hopper into the openings. The openings 10 and the double incline 9 are formed in a casting or member 12, which extends longitudinally of the hopper and constitutes its bottom and is secured to the side portion or trough 1 of the hopper by screws or other suitable devices 13. The feed-screw or conveyer is housed on the upper side by this casting 12, as clearly appears in Figs. 2 and 3, and on the lower side by the upper ends of the chutes 4 and a curved plate 14, secured to the lower edges of the trough portion 1, and which plate 14 extends between the inner sides of the chute 4, the latter being located directly under the extremities of the feed-screw or conveyer which is of opposite turn—that is, right or left hand—so as to feed or work the contents of the hopper in opposite directions into the chutes 4, respectively. The inclines 11 are secured at their edges to the trough portion 1, and the ends of the latter may be attached in any suitable way to the end walls 2, thus rigidly binding all parts together.

The extremities of the feed-screw or conveyer are each formed with a reduced extension 15, and these extensions 15 are journaled in the bearings 3, respectively, of the end casting and continued outwardly to form axles or spindles for the side wheels 16, one of which latter is secured to one of the spindles or extensions 15 by means of a set-screw 17 or other suitable device, so as to compel the screw to revolve with the ground-wheels as the device is pulled or propelled along, while the other of the side wheels 16 may be held in place on its spindle by any convenient means, such as a pin 18. It will thus be seen that the rotation of the side ground-wheels 16 is imparted directly to the feed-screw or conveyer, and this in turn constitutes an axle for said wheels, the longitudinal movement of the axle being limited by the shoulders formed at the intersection of the spindles 15 and screws 7 and also by the wheels themselves butting against the outer ends of the bearings 3. Consequently it will be seen that if it be desired to stop the operation of the feed-screw or conveyer while moving the apparatus from place to place it is simply necessary to elevate the forward end of the apparatus until the side wheels 16 no longer touch the ground, when the rotation of the feed-screw will cease. With this object in view a third wheel, 19, is provided and journaled in the after end of a frame constituted, preferably, by two bars 20, secured to the end castings 2 by screws 21 or other suitable devices and being bent together at their forward ends, as shown at 22, so as to provide for the attachment of a draft device or handle 23, which is connected to the portions 22 by bolts 24 25, the latter of which passes through a slot 26 in each of the portions 22, so as to enable the handle 23 to be set at various degrees of inclination to suit the height of different users, the bolt 25 being set tight when the handle is adjusted, as will be understood. Thus it will be seen that should it be desired to stop the operation of the feed-screw or conveyer while going to and from the place where it is desired to plant the grain or feed it is simply necessary to lift the handle 23 until the side wheels 16 are no longer in contact with the ground, whereupon the device may be pushed or pulled wherever desired while supported upon the wheel 19 alone.

The top of the hopper is shown as closed by a lid composed of a grating 27, which will prevent the poultry from feeding directly from the hopper, while enabling the operator to observe the contents of the hopper.

Having thus described my invention, what I claim as new therein, and desire to secure by Letters Patent, is—

1. In a device for the purpose described, the combination of a hopper, a feed device journaled therein, ground-wheels for supporting said hopper and one of which is connected directly with said feed device for operating it, a third wheel contributing to the support of said hopper and means whereby the hopper may be supported entirely upon said third wheel and the said wheels elevated from the ground.

2. In a device for the purpose described, the combination of a hopper, a feed-screw journaled in the bottom thereof and having projecting ends, ground-wheels for supporting the hopper secured on said ends, a third ground-wheel contributing to the support of the hopper, and a handle whereby the hopper may be elevated and supported upon said third wheel entirely with the first said wheels elevated from the ground.

3. In a device for the purpose described, the combination of a hopper comprising a trough-shaped portion and end walls detachably secured thereto, journal-bearings formed on said end walls, a feed-screw arranged in the bottom of said hopper and having projecting ends journaled in said bearings, and wheels upon which said projecting ends are mounted.

4. In a device for the purpose described, the combination of a hopper comprising a trough-shaped portion and end walls secured thereto, journal-bearings formed on said end walls, a feed-screw having projecting ends journaled in said bearings, wheels in which said projecting ends are supported, and chutes formed on said end walls and projecting downwardly from said screw.

5. In a device for the purpose described, the combination of a hopper comprising front and back boards, a bottom casting having apertures separated by a double incline, the under side of said bottom portion being curved, and end walls secured to said front and back boards, a feed-screw journaled under the curved part of said bottom and having projecting ends, journaled bearings formed on said end walls and receiving said projecting ends, wheels upon which said projecting ends are supported, and a curved plate secured under said feed-screw and housing at the lower side thereof.

WM. H. STRATHMANN.

Witnesses:
F. A. HOPKINS,
M. B. ALLSTADT.